Figure 1:
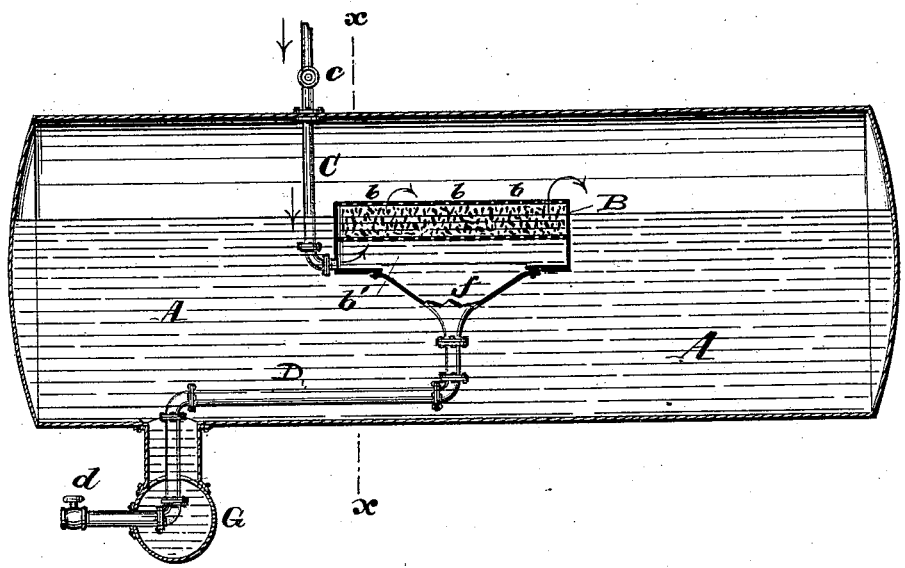

(No Model.) 2 Sheets—Sheet 1.

G. G. MINOR & J. D. SULLIVAN.
FEED WATER HEATER.

No. 326,580. Patented Sept. 22, 1885.

Attest
Carl Spengel
Ed. W. Deetar

Inventors
Geo. G. Minor and
Jno. D. Sullivan
by Stem & Beck their Att'ys.

(No Model.) 2 Sheets—Sheet 2.
G. G. MINOR & J. D. SULLIVAN.
FEED WATER HEATER.
No. 326,580. Patented Sept. 22, 1885.
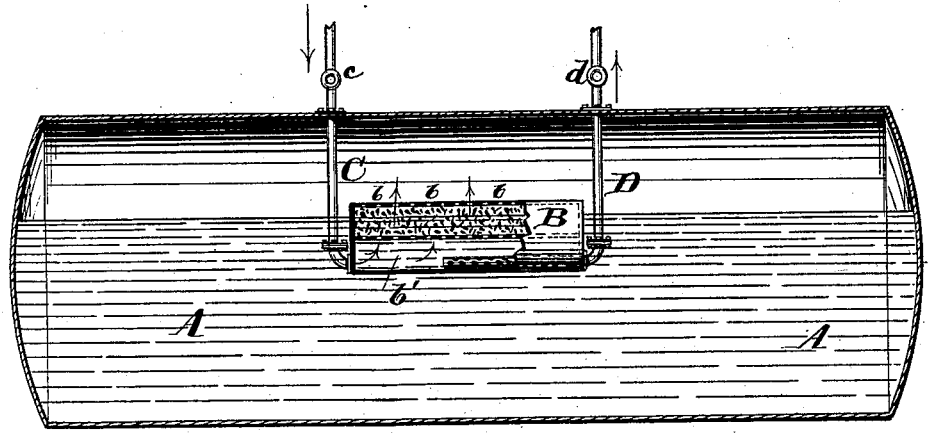
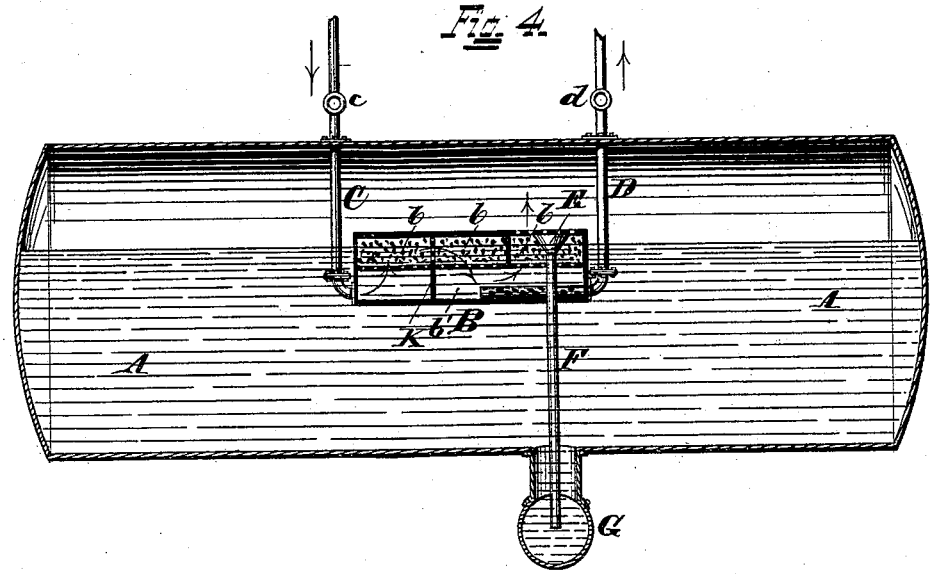

UNITED STATES PATENT OFFICE.

GEORGE G. MINOR, OF CINCINNATI, OHIO, AND JOHN D. SULLIVAN, OF COVINGTON, KENTUCKY.

FEED-WATER HEATER.

SPECIFICATION forming part of Letters Patent No. 326,580, dated September 22, 1885.

Application filed September 22, 1884. (No model.)

*To all whom it may concern:*

Be it known that we, GEORGE G. MINOR, a citizen of the United States, residing at Cincinnati, in the county of Hamilton and State of Ohio, and JOHN D. SULLIVAN, a citizen of the United States, residing at Covington, in the county of Kenton and State of Kentucky, have invented certain new and useful Improvements in Combined Feed-Water Heaters, Filters, and Cleaners for Boilers, of which the following is a full, clear, and exact description, reference being had to the accompanying drawings, forming a part of this specification.

Our invention has for its object, primarily, the purification of the feed-water of boilers by the heating and filtration of the same within the boiler, whereby the silt, lime, and other impurities are removed therefrom, and whereby incrustation or scaling of the boiler is prevented; and this we do by placing within the boiler a heating and filtering chamber, into which the feed-water is conducted and compelled to pass through proper filtering material before it can escape into the boiler. This filtering-chamber is further provided with a sediment-collecting chamber with a suitable blow-off pipe, whereby the collected sediment may, at stated intervals, or when desired, be blown off and the filtering material cleansed at the same time.

The novelty of our invention consists, first, in the combination, with a boiler, of a heating and filtering chamber located within the boiler, and a feed-water pipe entering said filtering-chamber, whereby the entering feed-water is heated to the boiling-point before it is discharged into the boiler, and whereby it is compelled to pass through the filtering material before it enters the boiler; second, in the combination, with a boiler, of a filtering-chamber located within and partly submerged in the water of the boiler, and a feed-water pipe entering said filtering-chamber, whereby the entering feed-water is heated to the boiling-point before it is discharged into the boiler, and whereby it is compelled to pass through the filtering material before it enters the boiler; third, in the combination, with a boiler, of a filtering-chamber located within the boiler, a feed-water pipe entering said filtering-chamber, and a blow-off pipe leading from said filtering-chamber, whereby the entering feed-water is heated to the boiling-point before it is discharged into the boiler, and whereby it is compelled to pass through the filtering material before it enters the boiler, and whereby the collected sediments or deposits may be blown off at pleasure to remove the same, and at the same time cleanse the filtering material; fourth, in the construction and combination of the elements employed, all as will be herewith set forth and specifically claimed.

Figure 2:
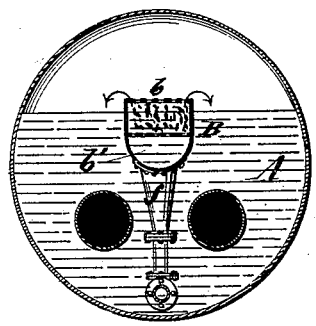

In the accompanying drawings, Figure 1, Sheet 1, is a longitudinal sectional view of a boiler in elevation containing our combined feed-water heater, filter, and cleaner. Fig. 2, Sheet 1, is a transverse sectional view through the line $x\,x$ of Fig. 1. Fig. 3, Sheet 2, is a longitudinal sectional view in elevation of a boiler containing our combined feed-water heater, filter, and cleaner, and showing a modification in the arrangement of the blow-off pipe. Fig. 4, Sheet 3, is a corresponding view with a further modification, showing a funnel-mouthed pipe communicating with the mud-drum.

The same letters of reference are used to indicate identical parts in all the figures.

A represents any boiler—in this instance a two-flue boiler—which may or may not be provided with the mud-drum G. Located within this boiler, and preferably partly submerged in the water thereof, is our heating and filtering chamber B, which may be made of sheet metal, with a rounded bottom, as shown, and divided into two compartments, the upper one, $b$, of which contains any proper filtering or purifying material, preferably carbon—such as charcoal, coke, or the like—and into the lower one, $b'$, of which the feed-water is conducted through the pipe C, provided with a valve or cock, $c$. The division-plate upon which the filtering material rests may be any suitable screen or grating, or a perforated plate, and we preferably cover the filtering material on the top of the chamber B with a similar screen, grating, or perforated plate, as shown, so that while the filtering material is held between these two gratings the entering feed-water can readily pass up through it and be discharged into the boiler.

It is a well-known fact that water heated to the boiling-point undergoes a chemical change which separates the impurities held in solution, which are either precipitated, float as scum, or are held in suspension, so that such water can be filtered and the impurities removed. The impurities separated or precipitated by the filtering material are collected in the lower compartment, $b'$, of the chamber, and to secure their ready removal when desired we provide the blow-off pipe D, which in our preferred construction, as seen in Figs. 1 and 2, is connected by suitable joints to a funnel or pocket, $f$, secured to or forming part of the under side of the chamber B, and communicating with the compartment $b'$. The blow-off pipe, in this instance, may extend along near the bottom of the boiler, and, descending through a leg of the mud-drum, may pass out of the latter, and is provided with a cock or valve, $d$, which remains closed except at such times as the engineer desires to blow off the collected sediments, when the feed-water cock $c$ is closed and the cock $d$ opened. The steam-pressure within the boiler at once forces the contents of the compartment $b'$ and the blow-off pipe out, and at the same time, by the passage of the steam through the filtering material, cleanses the same, as will be readily understood.

The advantages of this construction are the heating of the feed-water and the purification of the same before it is discharged into the boiler, and by the location of the blow-off pipe below the filtering-chamber a much larger amount of sediment can be collected before it becomes necessary to blow it off, thereby not only saving the engineer's time, but lessening the loss of heated water and steam.

The modification in Fig. 3 consists merely in taking the blow-off pipe into the compartment $b'$ and perforating it within said compartment, as shown; and in this construction the feed-water and blow-off pipes serve to support the filtering-chamber within the boiler.

In the modification shown in Fig. 4 we have added to the construction in Fig. 3 an additional pipe, F, which passes down into the mud-drum, and has a funnel, E, at its upper end at the average level of the water in the boiler, to serve as a surface blow-off to collect any sediment or scum which might escape from the filtering material and be floating upon the surface of the water and to deposit the same in the mud-drum.

If desired, the chamber B may be subdivided by partitions, as shown, and the water may be compelled to take the direction of the arrows before it is discharged into the boiler, though this we consider immaterial.

While we have illustrated our invention as applied to horizontal and stationary boilers, we purpose to apply it to locomotive and, in fact, all classes of boilers.

We are aware that pans or vessels to receive the feed-water have been placed within the boiler; but we believe ourselves to be the first to place a heating and filtering chamber within a boiler for the combined purposes of heating and purifying the water by filtration; and

What we claim is—

1. The combination, with a boiler, of a filtering-chamber located within and partly submerged in the water of the boiler, and a feed-water pipe entering said filtering-chamber at or near the bottom, whereby the entering feed-water is heated to the boiling-point before it is discharged into the boiler, and whereby it is compelled to pass through the filtering material before it enters the boiler.

2. The combination, with a boiler, of a filtering-chamber located within the boiler, a feed-water pipe entering said filtering-chamber at or near the bottom, and a blow-off pipe leading from said chamber, whereby the entering feed-water is heated to the boiling-point before it is discharged into the boiler, and whereby it is compelled to pass through the filtering material before it enters the boiler, and whereby the collected sediments or deposits may be blown off at pleasure to remove the same, and at the same time cleanse the filtering material.

3. A combined heating and filtering chamber located within a boiler, having a lower submerged compartment into which the feed-water flows, and an upper filtering-chamber, partly submerged, through which the feed-water must pass before it can enter the boiler, in combination with the feed-pipe C and blow-off pipe D, substantially as described.

4. In combination with the feed-pipe C and heating and filtering chamber B, arranged as shown, the blow-off pipe D, located below and communicating with the lower compartment of the filtering-chamber, whereby said blow-off pipe becomes a reservoir for the collected sediment before the same is blown off, substantially as described.

GEO. G. MINOR.
JOHN D. SULLIVAN.

Witnesses:
E. W. RECTOR,
OTTO RICHTER.